May 27, 1969   R. L. TRAPP   3,446,303
ENDLESS TRACK VEHICLE
Filed June 22, 1966   Sheet 1 of 2
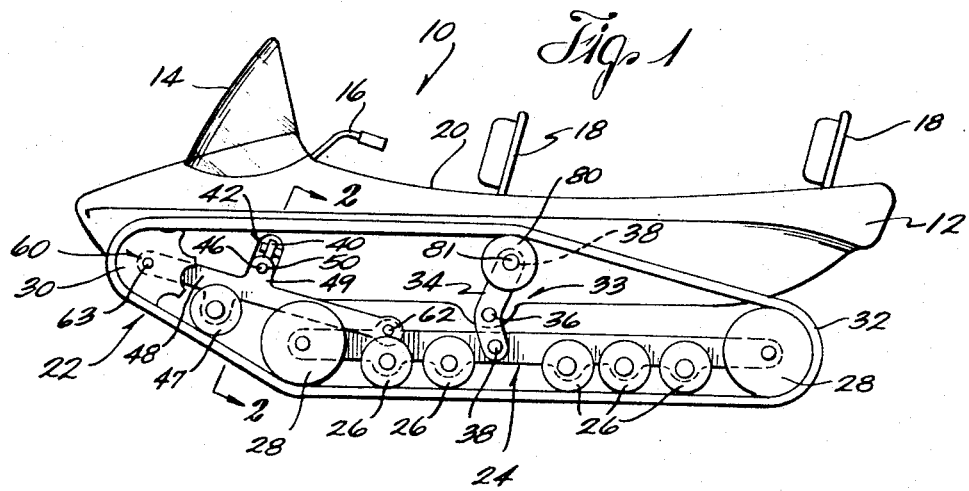
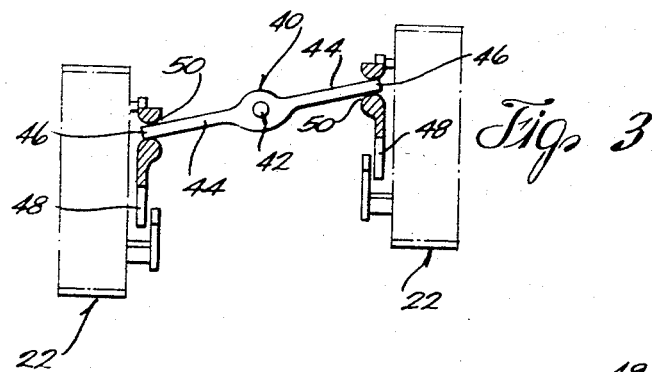
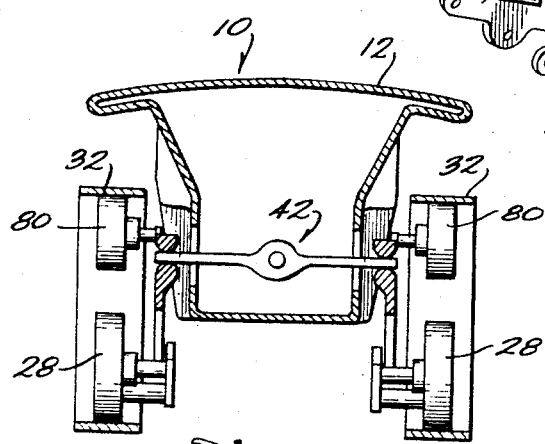
Inventor
Robert L. Trapp
By Wheeler, Wheeler & Wheeler
Attorneys

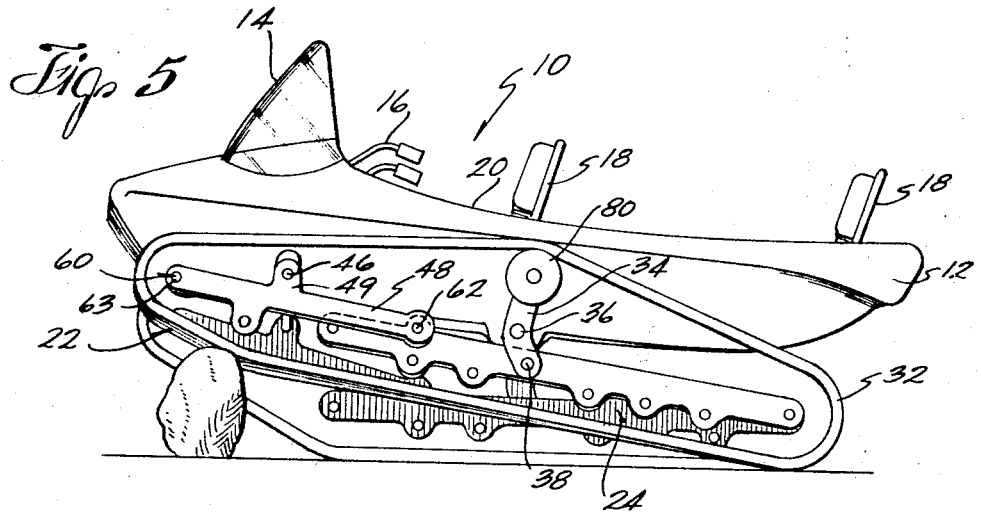
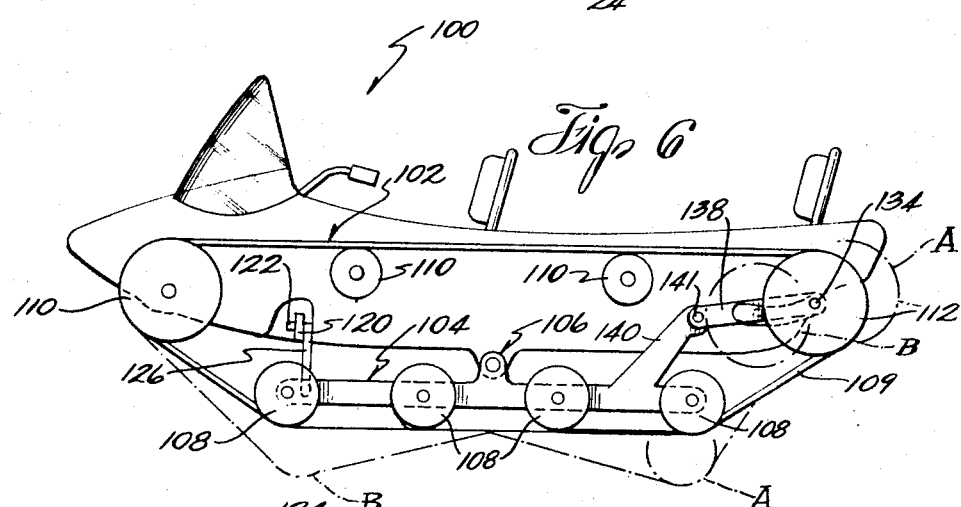
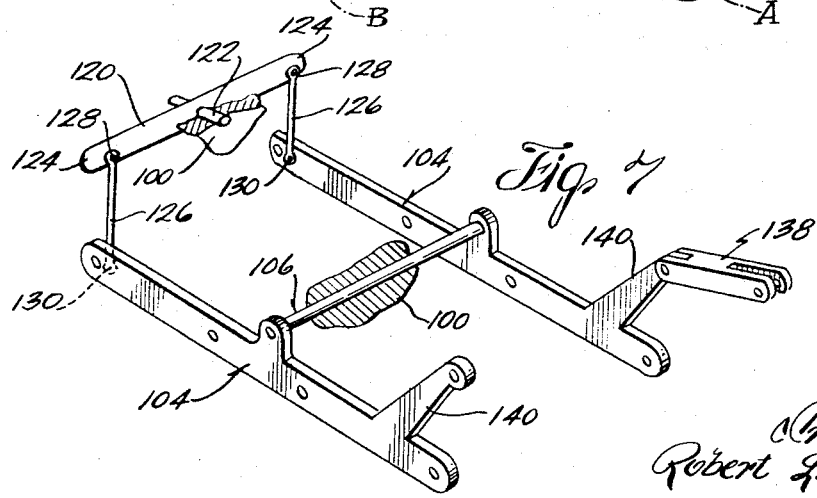

United States Patent Office 3,446,303
Patented May 27, 1969

3,446,303
ENDLESS TRACK VEHICLE
Robert L. Trapp, Milwaukee, Wis., assignor to Outboard Marine Corporation, Waukegan, Ill., a corporation of Delaware
Filed June 22, 1966, Ser. No. 559,560
Int. Cl. B62d 55/06, 55/16
U.S. Cl. 180—9.5
4 Claims

ABSTRACT OF THE DISCLOSURE

Disclosed herein is a vehicle comprising spaced apart track frames with endless tracks carried on the track frames, drive sprockets carried on the vehicle and respectively disposed for operative driving engagement with the tracks, means pivotally connecting the track frames to the vehicle at points spaced from the drive sprockets to afford oscillatory movement of the track frames about an axis transverse of said track frames, and cross-coupled means for connecting said track frames to said vehicle to afford pivotal movement of one of said track frames in response to opposite pivotal movement of the other of said track frames. Also disclosed herein is means located in part on the vehicle body for affording automatic track tensioning in response to movement of said track frames.

---

This invention relates to vehicles, and more particularly to vehicles having oscillable track frames carrying endless driving tracks.

An object of the invention is to provide a tracked vehicle which reduces the rate of initial and terminal tilting of the vehicle in response to the encounter of one track with an obstacle during vehicle movement or upon operation of the vehicle over rough terrain.

Another object is to provide a vehicle having endless tracks which are automatically properly tensioned for any position of the track frames.

In accordance with the invention, there is provided a vehicle having a pair of spaced track frames pivotally carried on a vehicle body and a pair of endless tracks respectively trained around the track frames and around at least one rotatable carrier or sprocket mounted on the vehicle. Also, in accordance with the invention, across coupler means is provided for connecting the track frames to each other and to the vehicle to thereby afford pivotal movement of one of the track frames in response to opposite and equal pivotal movement of the other track frame relative to the vehicle body whereby the rate of tilting of the vehicle is substantially reduced, i.e. reduced by a value of one half. Means operable in response to pivotal movement of the track frames are provided for automatically properly tensioning the endless tracks for any position of the track frames.

Other objects, advantages and features will become apparent from the following description and accompanying drawings in which:

FIGURE 1 is a side, elevational view of a vehicle incorporating various of the features of the invention;

FIGURE 2 is a cross sectional view taken along line 2—2 of FIGURE 1;

FIGURE 3 is a cross sectional view similar to FIGURE 2 showing a portion of the vehicle in a changed condition;

FIGURE 4 is a perspective view of a portion of the vehicle shown in FIGURE 1;

FIGURE 5 is a side, elevational view similar to FIGURE 1 showing the vehicle in a changed condition;

FIGURE 6 is a side, elevational view of a vehicle embodying the modified form of the invention; and FIGURE 7 is a perspective view of a portion of the vehicle shown in FIGURE 6.

Referring now to the drawings and more particularly to FIGURE 1, the vehicle is broadly identified by the numeral 10 and generally comprises a vehicle body 12 having a windshield 14, a control lever 16, and seats 18 carried in the passenger well 20 of the body 12. Disposed on opposite sides of the vehicle are identical track assemblies 22 which are powered or driven by a suitable engine (not shown) to afford propulsion of the vehicle 10.

The track assemblies 22 each include track frame 24 which pivotally carries thereon support rollers or wheels 26 disposed between the ends of the respective track frame 24, and idler rollers or wheels 28 pivotally carried on the respective track frame 24 proximate the opposite ends of the track frame 24. Associated with each track assembly 22 is a drive sprocket 30 carried on the vehicle 10 in spaced or separated relation to the associated track frame 24. The drive sprockets 30 are operatively connected to the engine (not shown) to afford driving of respective endless tracks 32 which are trained around the respective sprockets 30 and track frames 24, including the idler rollers 28 and the support rollers 26 and which drivingly engage the ground to propel the vehicle 10.

Means are provided for respectively pivotally connecting the track frames 24 to the opposite sides of the vehicle 10 at points spaced from the ends of the track frames 24 to afford oscillatory movement of the track frames 24 about a common axis transverse of the track frames 24. In the preferred embodiment, said means comprises pivot means 33 in the form of an arm 34 pivotally connected to the vehicle body 12 by a pivot 36 and also pivotally connected to the track frame 24 by a pivot 38. Each arm 34 has a free end 38 which will be described hereinafter.

Cross coupler means are provided for connecting the track frames 24 to the vehicle 10 to afford pivotal movement of one of the track frames 24 in response to opposite pivotal movement of the other of the track frames 24 to thereby materially reduce tilting of the vehicle body. In the illustrated embodiment (see FIGURE 3), the cross coupler means comprises a cross coupler link 40 which extends transversely of the track frames 24 and which is pivotally connected, intermediate its ends, to the vehicle 10 by pivot means 42. The cross coupler link 40 has oppositely extending arms 44 which terminate in opposite ends 46.

Further included as part of the cross coupler means are side or connecting links 48 which respectively connect the cross coupler link 40 to the track frames 24. To afford pivotal movement of the side links 48 relative to cross coupler link 46 and to afford in and out movement of the side links 48 relative to the cross coupler link 40, the side links 48 have extended portions 49 provided with bores 50 which respectively receive the ends 46 of the cross coupler link 40. The extended portions 49 are located generally intermediate the ends of the respective side links.

The opposite ends of the respective side links 48 are respectively pivotally connected to the vehicle 10 and to the track frames 24. Specifically, each side link 48 is pivotally connected to the vehicle 10 by pivot means 60 and to the respective track frames 24 by pivot means 62. As shown in FIGURE 1, the pivot means 60 can include the shaft 63 of drive sprocket 30. However, if desired, the side link 48 may be pivotally connected to the vehicle 10 at points spaced from the shaft 63. The side links 48 also pivotally carry rollers 47 which engage the tracks 32.

As shown in FIGURES 3 and 5, when either one of the tracks encounters an obstacle, pivotal movement of the one track frame 24 induces opposite and equal pivotal movement of the other of the track frames 24 relative to the vehicle body, to thereby reduce the rate of initial and terminal transverse and fore and aft tilting of the body relative to the ground. As shown in FIGURE 5, with one of the track assemblies 22 running over an object or obstruction on the ground, the track frame 24 of the track assembly encountering the object is pivotally moved in a clockwise direction, while the track frame 24 of the other track assembly 22 (shown in broken lines in FIGURE 5) remains in full contact with the ground to thereby reduce the rate of initial and terminal vehicle tilting relative to the ground.

Means operable in response to pivotal movement of the track frames 24 is provided for affording proper track tensioning for any position of the track frames 24. In the preferred embodiment, the tensioning means includes a roller 80 carried by pivot means 81 on the free end 38 of each arm 34. Each roller 80 engages the underside of the top run of the endless track 32 associated therewith to provide support of the span of the track 32 between the sprocket 30 and the most distant idler 28. Pivotal movement of the track frames 24 respectively causes movement of the arms 34 about the pivots 36. For clockwise pivotal movement of one of the track frames 24 as shown in FIGURE 5, the associated arm 34 rotates counterclockwise (about pivot 36) to thereby move or spread the track 32 outwardly and take up any slack in the track 32 caused by the pivotal movement of the one track frame 24. When one of the track frames 24 pivots in a counterclockwise direction, as shown by the broken lines in FIGURE 5, the associated arm 34 moves clockwise to allow the track to move inwardly.

In the alternative construction shown in FIGURES 6 and 7, vehicle 100 includes spaced track assemblies 102 which are disposed at the opposite sides of the vehicle 100 and which are respectively provided with track frames 104. The track frames 104 are respectively pivotally connected to the vehicle 100 by means in the form of pivots 106 and are provided with support rollers 108 which support endless tracks 109. Further included in each of the track assemblies 102 are respective drive sprockets 110 which are carried on the vehicle 100 and which are operatively connected to an engine (not shown) to afford driving of the vehicle 100. Pivotally carried on the vehicle 100 are upper support rollers 110 which support the span of the track between the sprockets 110 and idler rollers 112. The idler rollers 112 are pivotally carried on the vehicle 100 by means hereinafter to be described.

Cross coupler means are provided for connecting the respective track frames 104 to the vehicle 100 to afford pivotal movement of one of the track frames 104 in response to opposite pivotal movement of the other of the track frames 104 to thereby maintain the vehicle in a generally transversely level or horizontal condition relative to ground. In the preferred embodiment shown in FIGURES 6 and 7, the cross coupler means comprises a cross coupler link 120 pivotally connected to the vehicle 100 by pivot means 122 located intermediate the ends 124 of the cross coupler link. Connecting the cross coupler link 120 to the track frames 104 are connecting or side links 126. Specifically, the connecting links 126 are pivotally connected to the cross coupler link 120 by pivot means 128 and are respectively pivotally connected to the track frames 104 by pivot means 130. Pivot means 128 afford pivotal movement of the connecting links 126 about axes parallel to the track frames 104, and pivots 130 afford pivotal movement of the connecting links 126 relative to the track frames 104 about axes transverse of the track frames 104. Thus, as shown by the dotted lines in FIGURE 6, pivotal movement of one of the track frames 104 induces opposite and equal movement of the other track frame 104 to thereby maintain the vehicle body 101 in a generally horizontal or level condition relative to ground.

Means operable in response to pivotal movement of the track frames 104 are provided for affording proper track tensioning for any position of the track frames 104. In the preferred embodiment, said means comprises the idlers 112 carried on the vehicle 100 by means affording pivotal as well as translatory movement of the idlers 112 relative to the vehicle 100. Said means comprises pivots 134 disposed in guideways 136, together with means connecting the pivots 134 to the track frames 104 for affording translatory movement of the idlers 112 in response to track movement. Said connecting means comprises tensioning links 138 respectively pivotally connected to the pivots 134 of the idlers 112 and to upwardly extending brackets 140 of the track frames 104 by pivot means 141. Thus, clockwise movement of the track frames 104 (as seen in FIGURE 6) moves the associated idler 112 to the right, as shown by the letter A in FIGURE 6, affording outward track movement or a spreading of the track 32 to afford proper track tensioning. Conversely, counterclockwise movement of the track frames 104, moves the idler to the left, as shown by the letter B in FIGURE 6 to allow the track to move inwardly, thereby affording proper track tensioning.

Various of the features of the invention are set forth in the following claims:

What is claimed is:

1. A vehicle comprising a body, spaced track frames, means pivotally connecting said track frames intermediate the ends thereof to said body for affording oscillatory movement of said track frames about an axis transverse of said body, a cross coupler link, means pivotally connecting said cross coupler link to said body for pivotal movement transversely of said track frames, connecting links, means respectively pivotally connecting said connecting links to said cross coupler link, to said track frames and to said body for affording pivotal movement of one of said track frames in response to opposite pivotal movement of the other of said track frames, endless tracks respectively carried on said track frames, and means located in part on said body for automatically maintaining track tension in response to oscillation of said track frames.

2. A vehicle comprising a body, spaced track frames, endless tracks respectively carried on said track frames, drive sprockets carried on said body and respectively disposed for operative driving engagement with said tracks, means pivotally connecting said track frames to said body at points spaced from said drive sprockets for affording oscillatory movement of said track frames about axes transverse of said track frames, and cross coupler means comprising a cross coupler link pivotally connected to said body for pivotal movement transversely of said track frames, connecting links, means connecting said connecting links, intermediate the ends thereof, to said cross coupler link for pivotal movement of said connecting links relative to said cross coupler link and for translatory movement of said connecting links relative to said cross coupler link, means pivotally connecting one of the ends of said connecting links to said body, and means pivotally connecting the other of the ends of said connecting links to said track frames.

3. A vehicle in accordance with claim 2 including means operatively connected to said body and to said track frames for automatically maintaining track tension in response to oscillation of said track frames.

4. A vehicle comprising a body, spaced track frames, means pivotally connecting said track frames intermediate the ends thereof to said body for according oscillatory movement of said track frames about an axis transverse of said body, cross coupler means pivotally connecting said track frames to said body for affording pivotal movement of one of said track frames in response to opposite pivotal movement of the other of said track frames, endless tracks respectively carried on said track frames, cam arms respectively pivotally connected to said body and respectively connected to said track frames, rollers pivotally carried on said cam arms and respectively disposed to engage said tracks, whereby pivotal movement of said track frames automatically moves said cam arms to afford proper tension of said tracks in any position of said track frames.

References Cited

UNITED STATES PATENTS

| 1,296,572 | 3/1919 | Turnbull | 305—22 |
| 1,450,465 | 4/1923 | Turnbull | 180—9.54 |
| 2,745,503 | 5/1956 | Fisher | 180—9.5 |
| 2,936,841 | 5/1960 | Mazzarins | 180—9.54 |
| 2,427,162 | 9/1947 | Schilling | 305—22 |
| 3,142,352 | 7/1964 | Johansson. | |

RICHARD J. JOHNSON, *Primary Examiner.*

U.S. Cl. X.R.

305—22, 25